United States Patent
Chang et al.

(10) Patent No.: US 9,189,814 B2
(45) Date of Patent: Nov. 17, 2015

(54) METHOD OF PROVIDING REMOTE FINANCIAL SERVICE USING REMOTE VIDEO BANKING MACHINE

(71) Applicant: Nautilus Hyosung Inc., Seoul (KR)

(72) Inventors: Bo Ik Chang, Seongnam-si (KR); Sung Suk Hong, Seoul (KR)

(73) Assignee: NAUTILUS HYOSUNG INC., Seoul (KR)

( * ) Notice: Subject to any disclaimer, the term of this patent is extended or adjusted under 35 U.S.C. 154(b) by 87 days.

(21) Appl. No.: 14/067,699

(22) Filed: Oct. 30, 2013

(65) Prior Publication Data

US 2014/0118466 A1     May 1, 2014

(30) Foreign Application Priority Data

Nov. 1, 2012 (KR) .................. 10-2012-0122905

(51) Int. Cl.
    *H04N 7/14*       (2006.01)
    *G06Q 40/02*     (2012.01)
    *G06Q 20/10*     (2012.01)
    *G06Q 20/18*     (2012.01)

(52) U.S. Cl.
    CPC ............... *G06Q 40/02* (2013.01); *G06Q 20/10* (2013.01); *G06Q 20/1085* (2013.01); *G06Q 20/18* (2013.01); *H04N 7/14* (2013.01)

(58) Field of Classification Search
    CPC ... G06Q 40/02; G06Q 20/1085; G06Q 20/18; G06Q 20/10; H04N 7/14
    USPC ................... 348/14.01–14.16; 705/42, 43
    See application file for complete search history.

(56) References Cited

U.S. PATENT DOCUMENTS 5,744,663 A *    4/1998    Landscheidt et al. ......... 570/250
8,332,319 B2 *   12/2012   Pranger ........................... 705/42
2008/0191008 A1 *   8/2008    Manfredi et al. ............. 235/379

* cited by examiner

*Primary Examiner* — Melur Ramakrishnaiah
(74) *Attorney, Agent, or Firm* — Fenwick & West LLP

(57) ABSTRACT

The present invention relates to a method of providing a remote financial service using a remote video banking machine, and more particularly, to a method of providing a remote financial service using a remote video banking machine that has a document processing module and a video consultation supporting module integrally incorporated into a banking machine, so as to perform a financial transaction, wherein respective procedures for a financial transaction of a customer is guided through a screen of a display, and at the same time, if necessary, remote video face-to-face consultation with an officer is supported, and various certificate documents related to the financial transaction can be directly submitted from a remote position through the document processing module during the financial transaction, so that the customer can remotely and easily perform complicated financial transactions, such as deposit and withdrawal as well as a new account opening or a loan, through an informal branch provided with the remote video banking machine without separately visiting a bank branch.

6 Claims, 24 Drawing Sheets

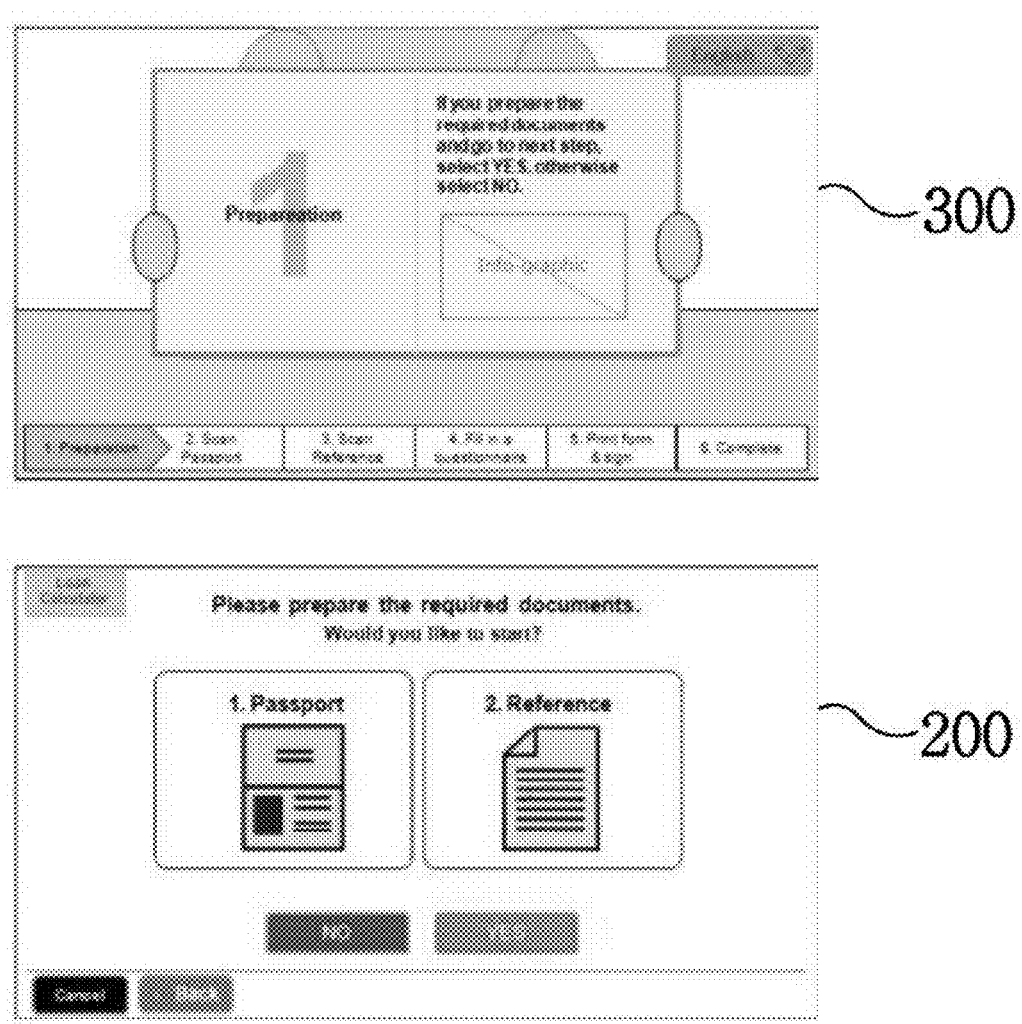
(b)

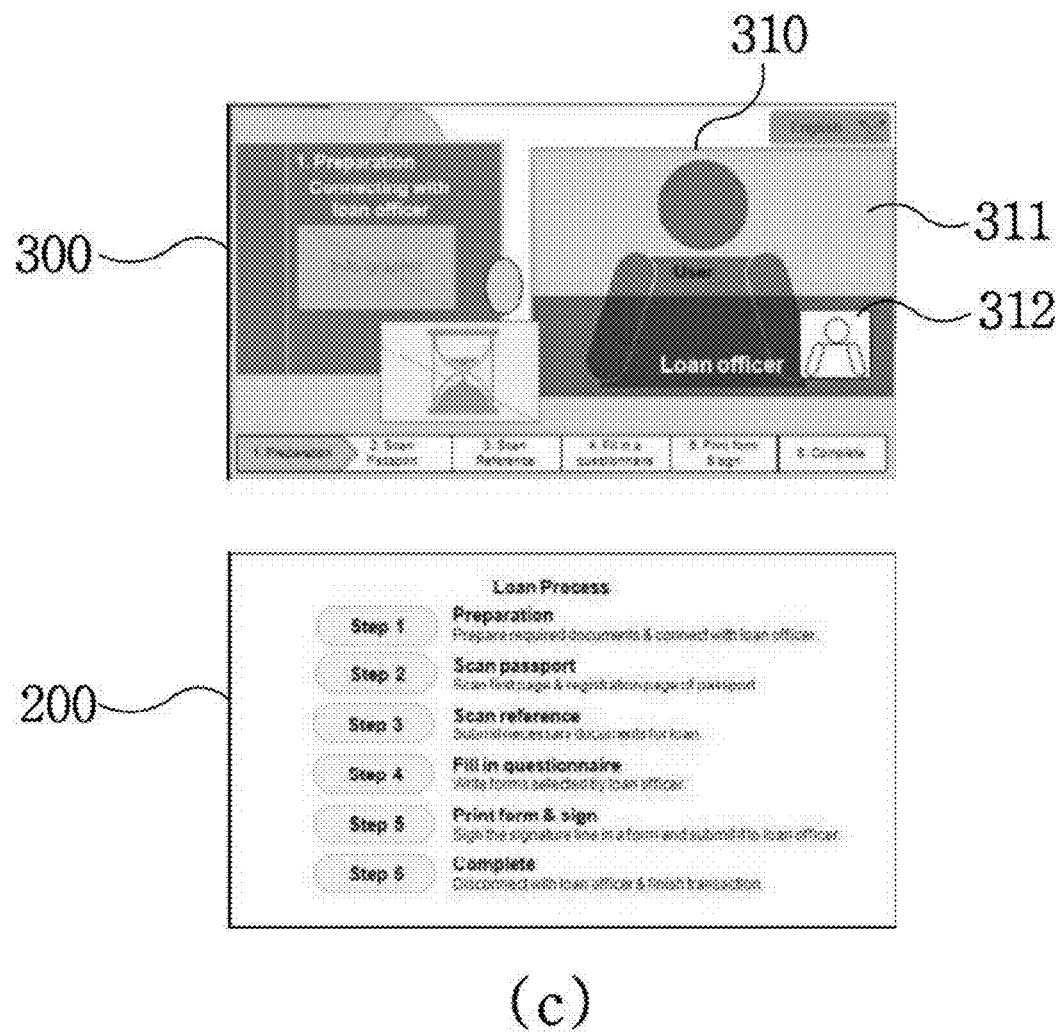
(c)

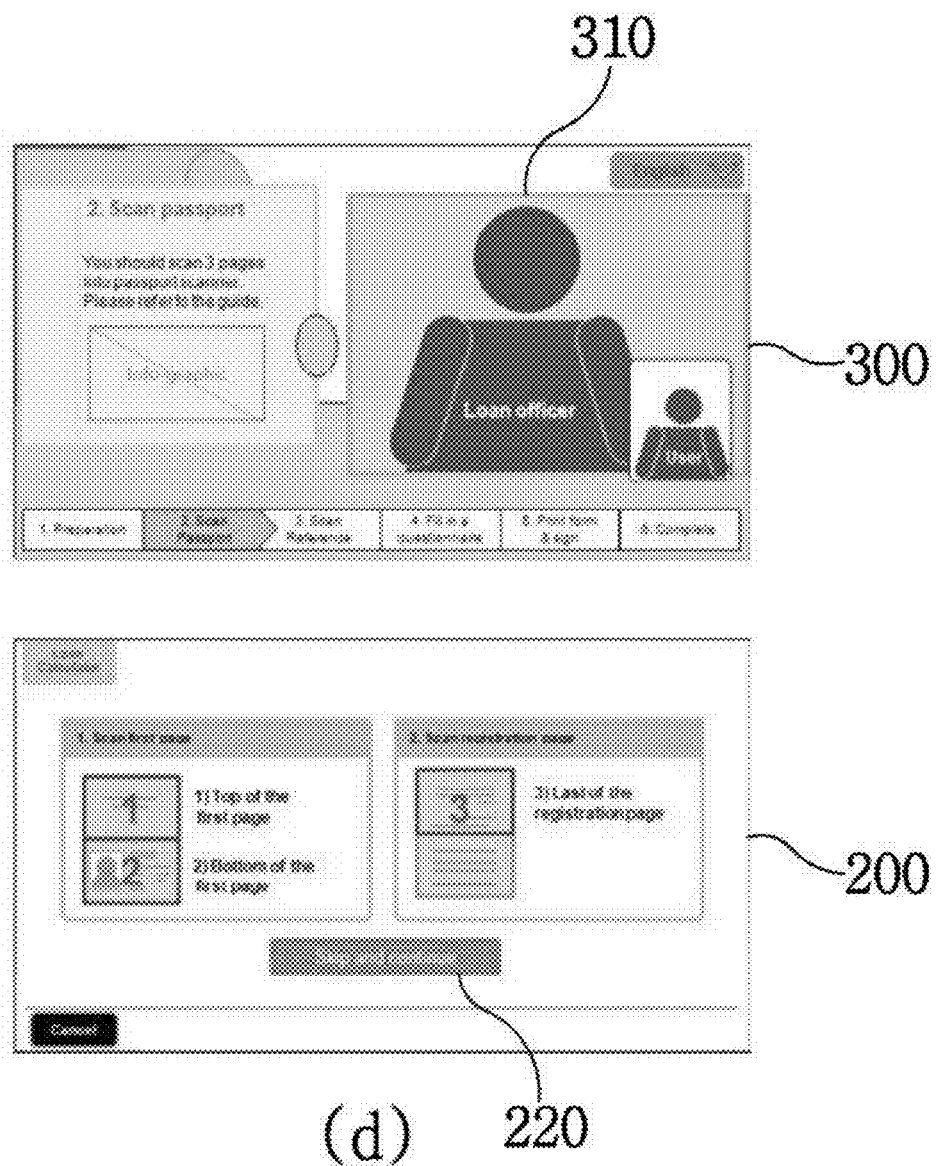

(a)

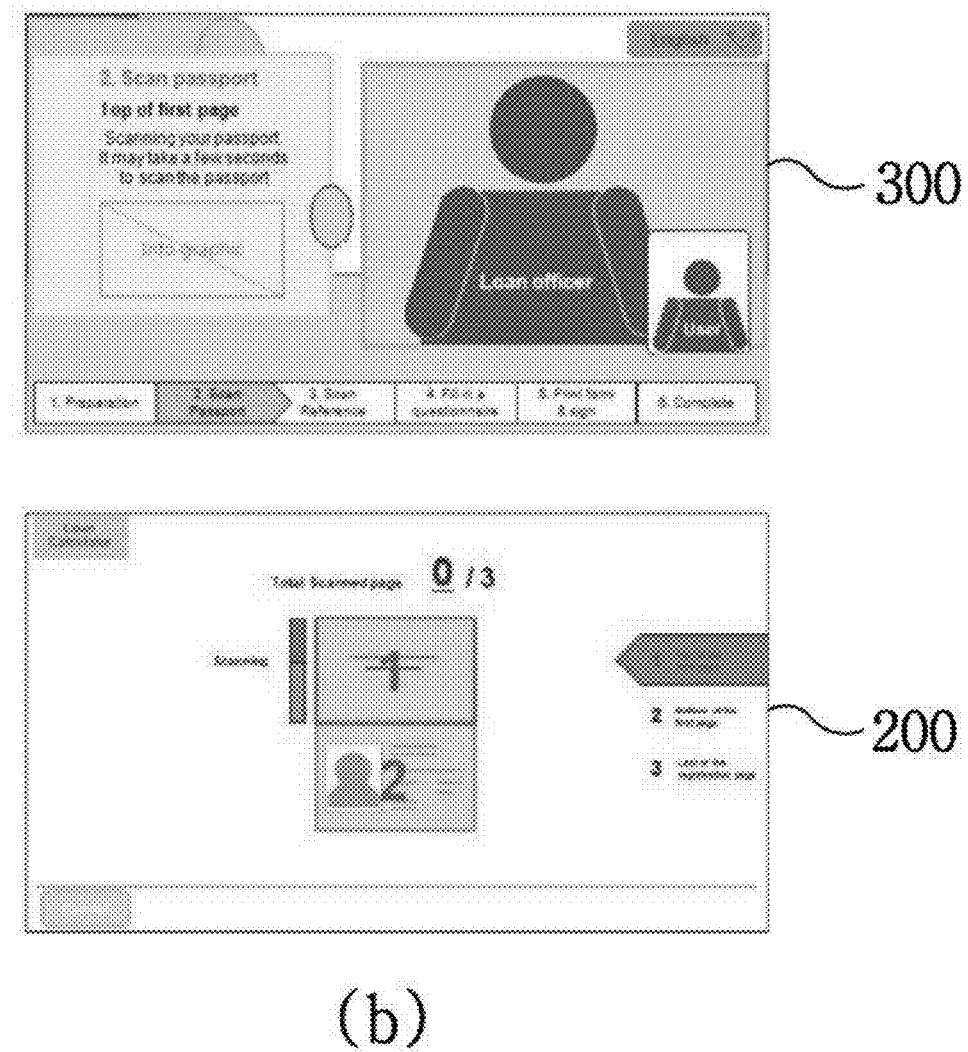
(b)

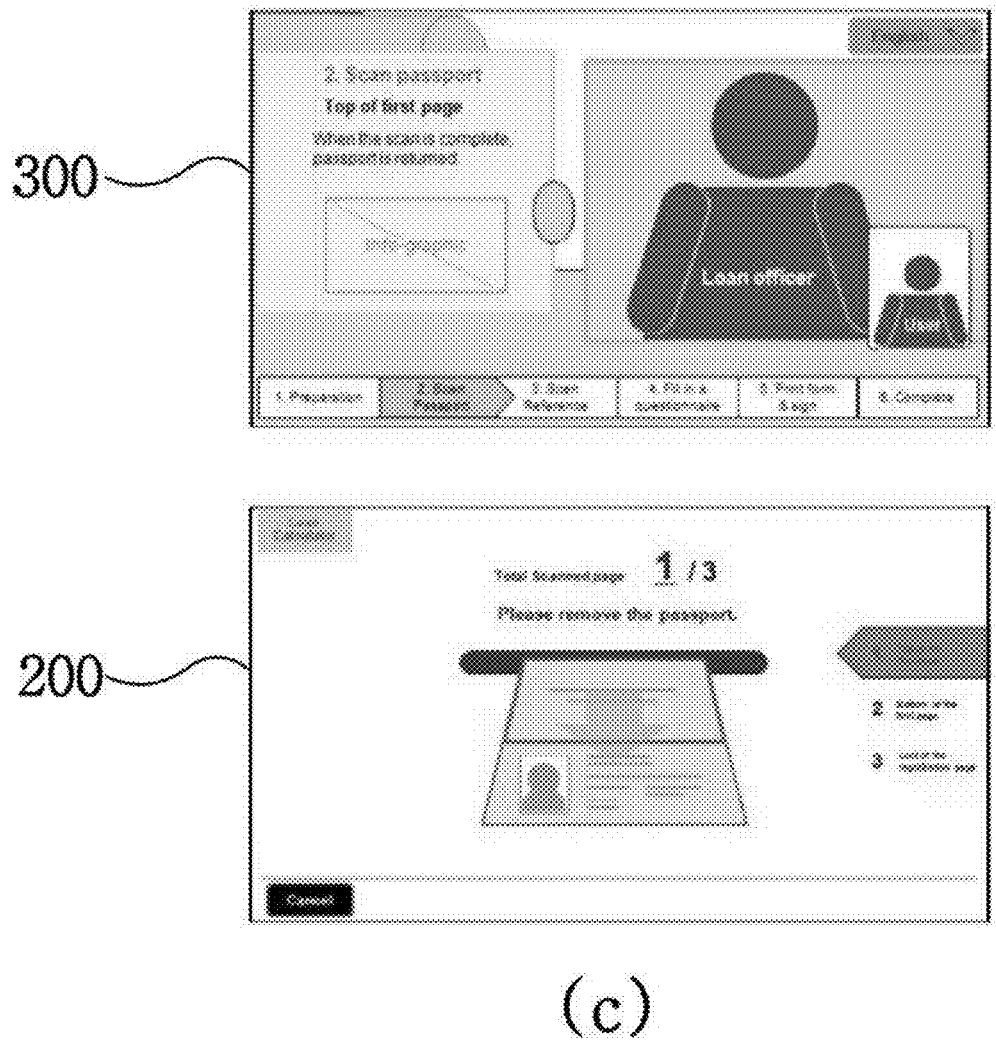
(c)

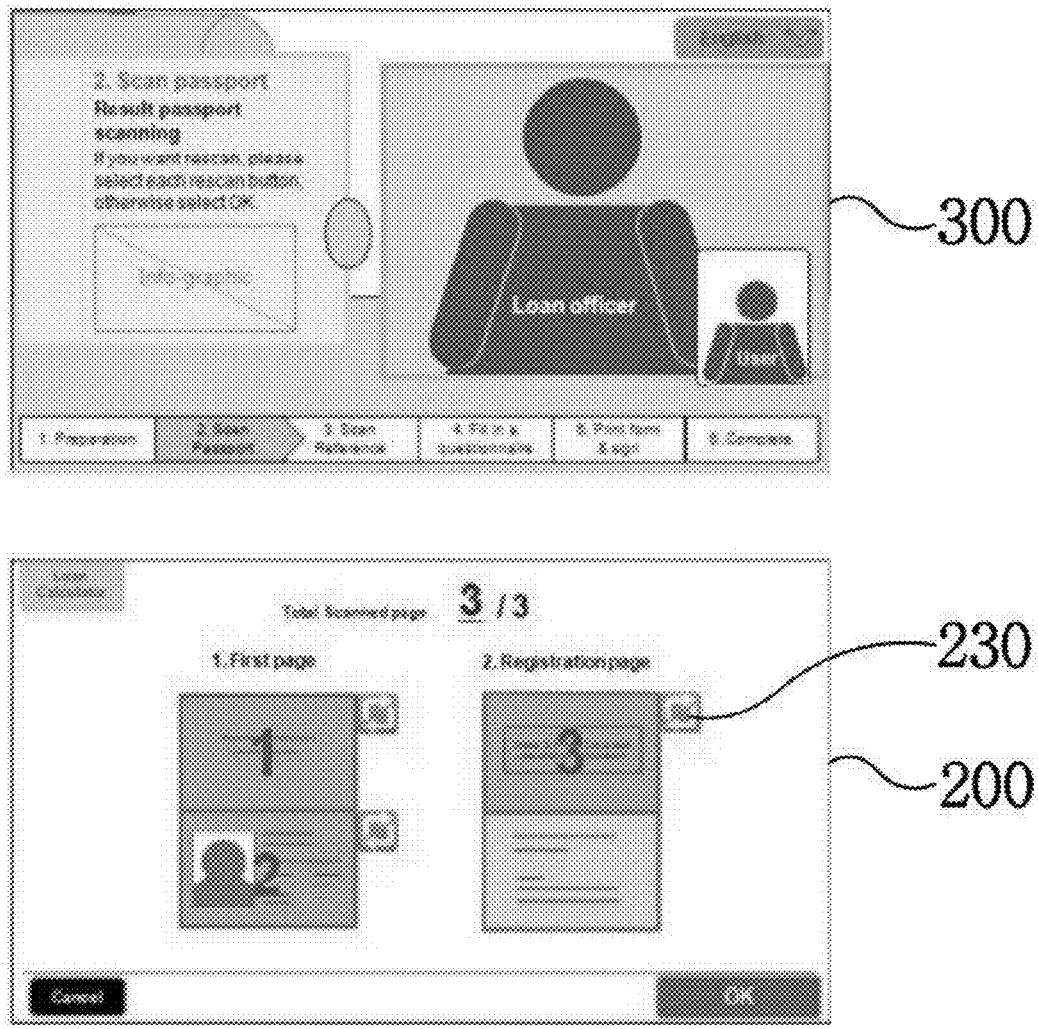
(d)

(a)

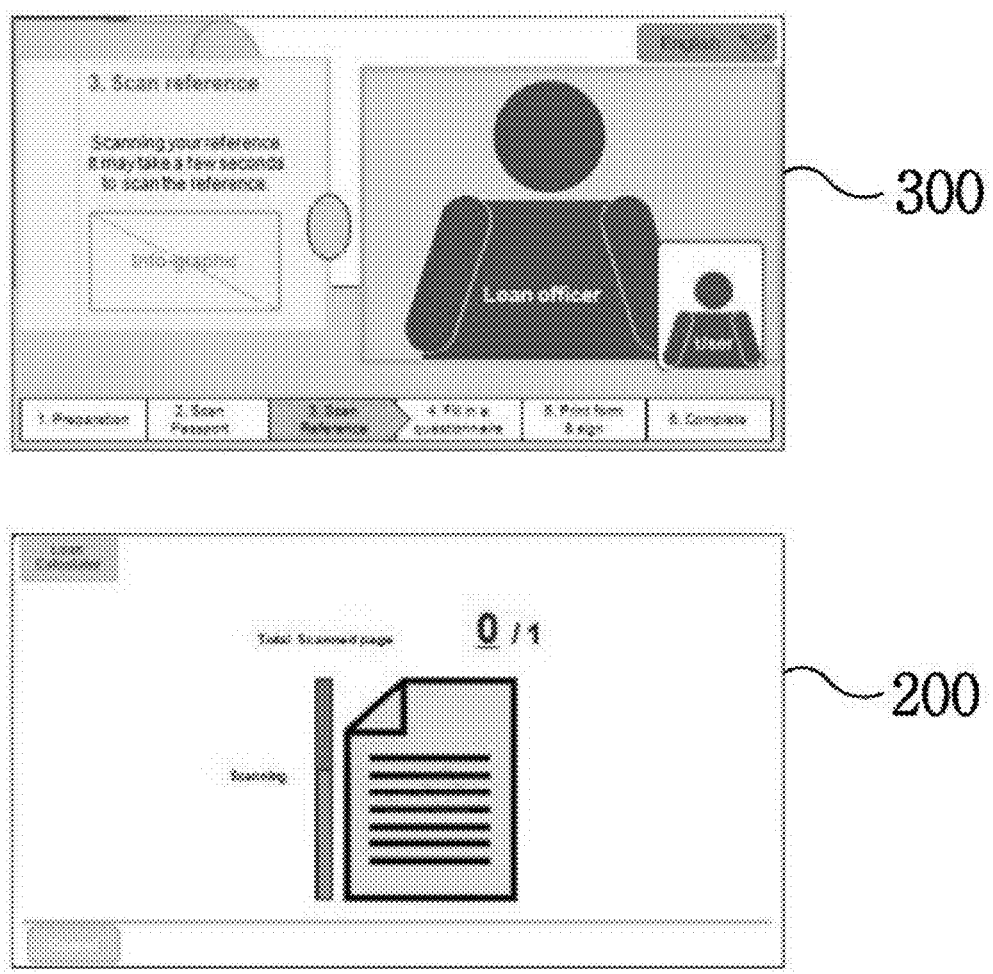
(b)

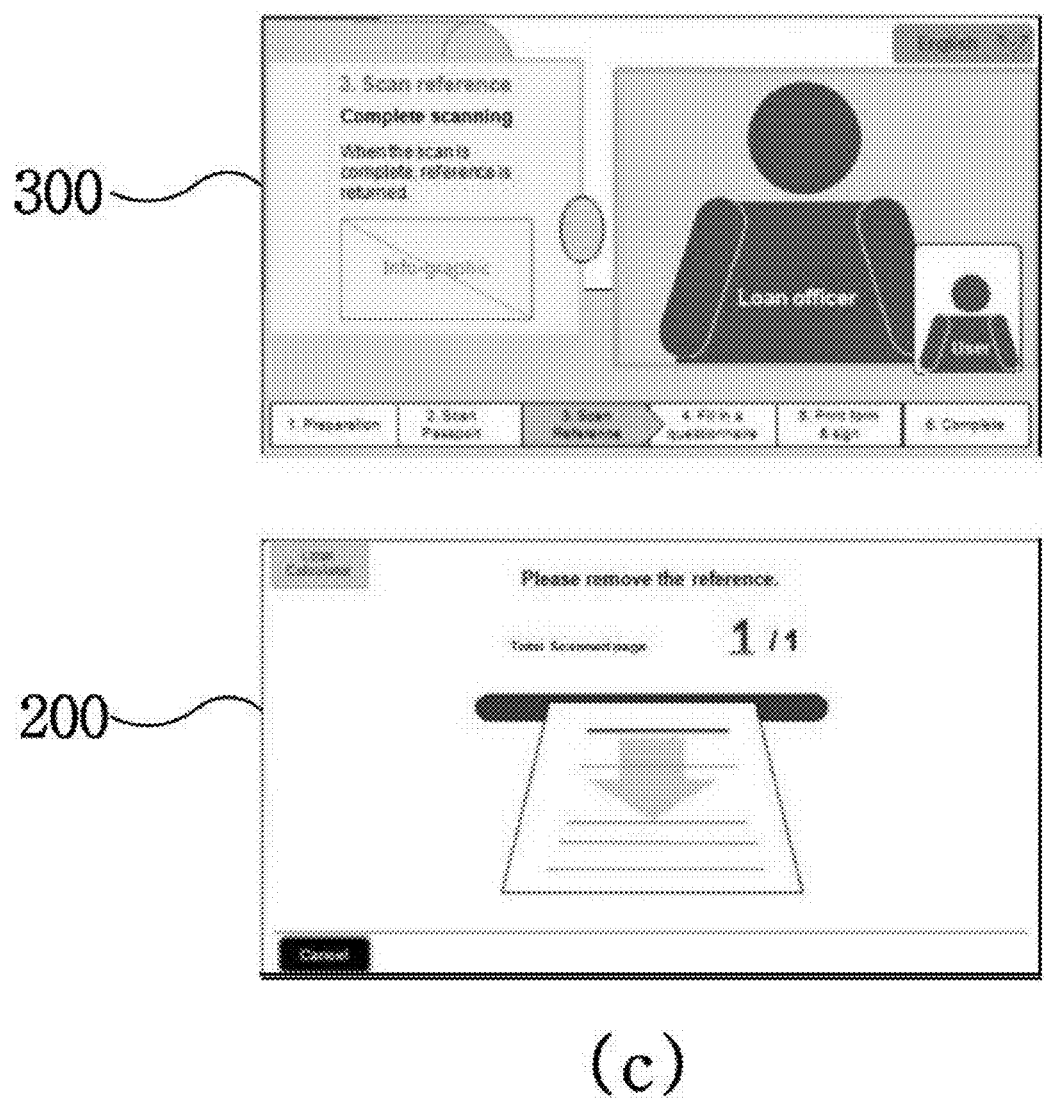
(c)

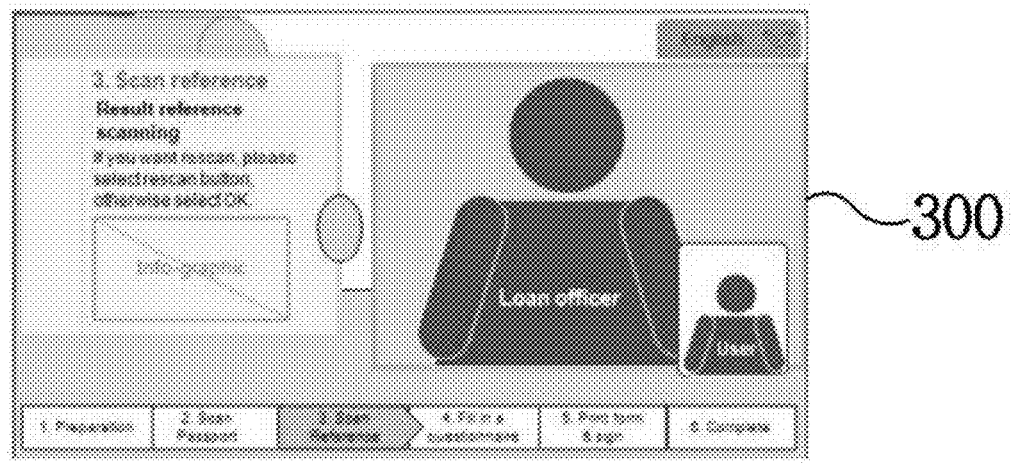
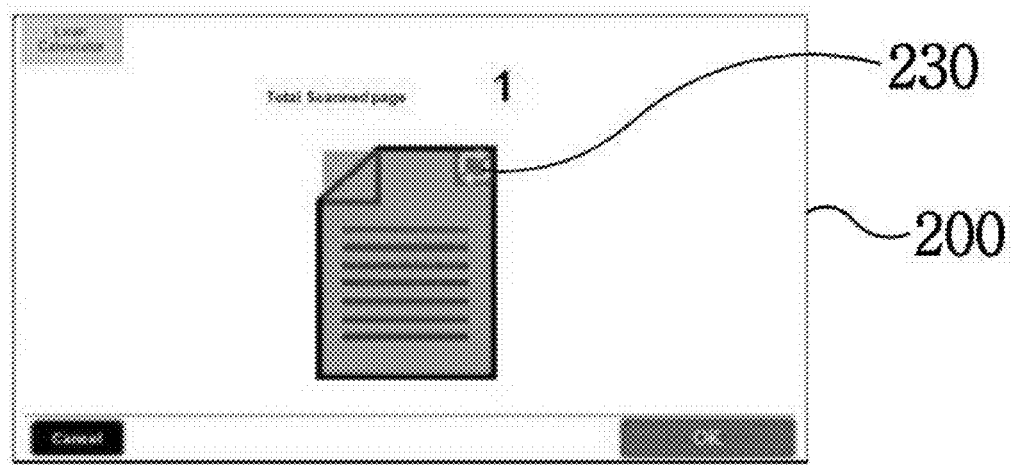
(d)

(a)

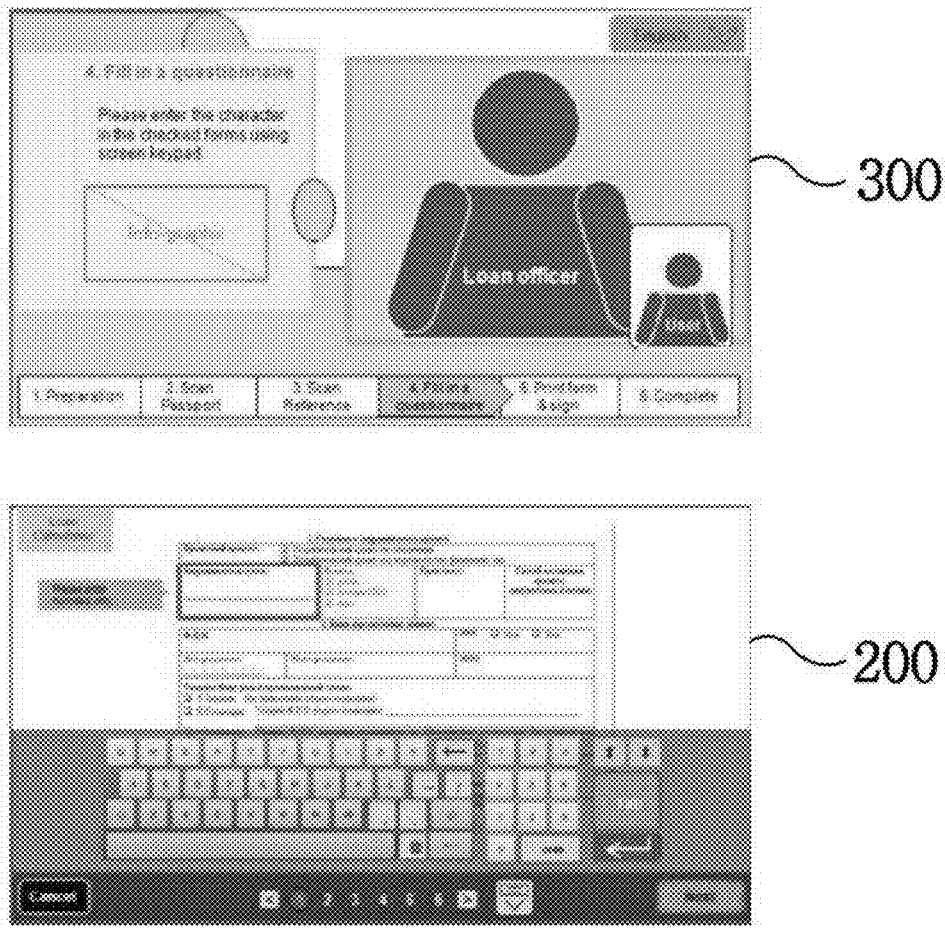
(b)

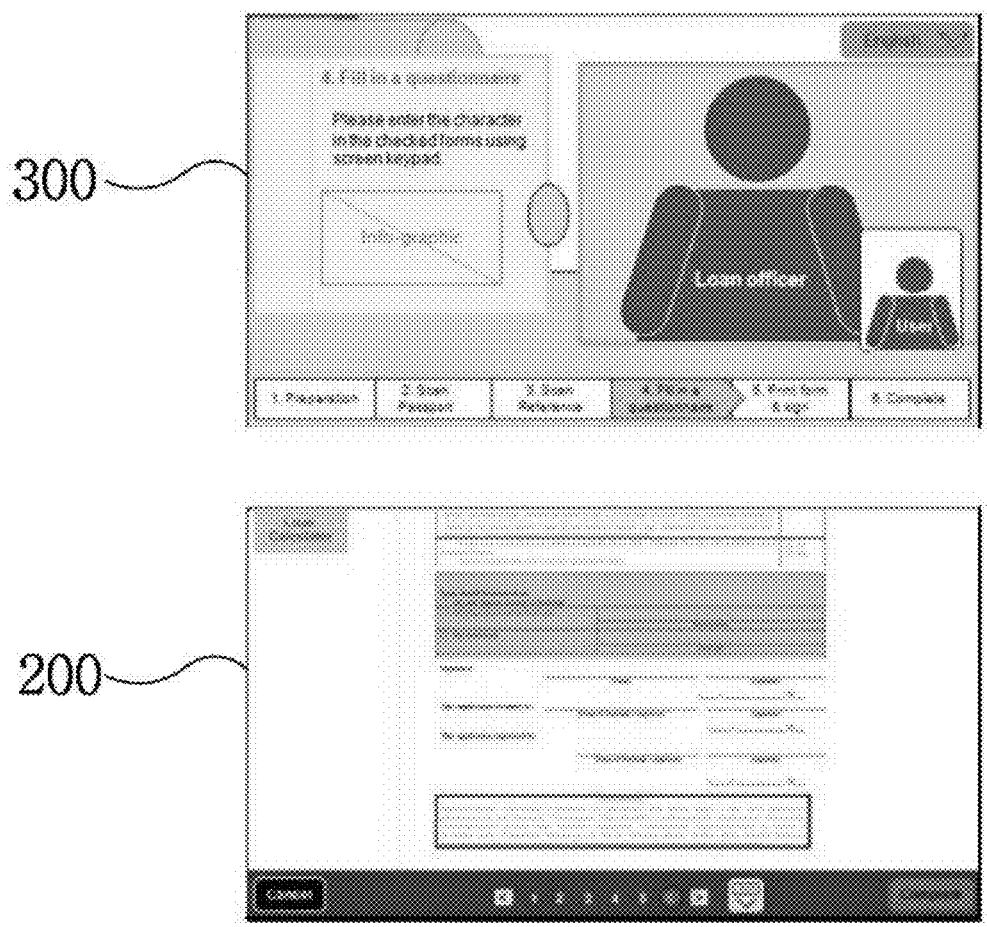
(c)

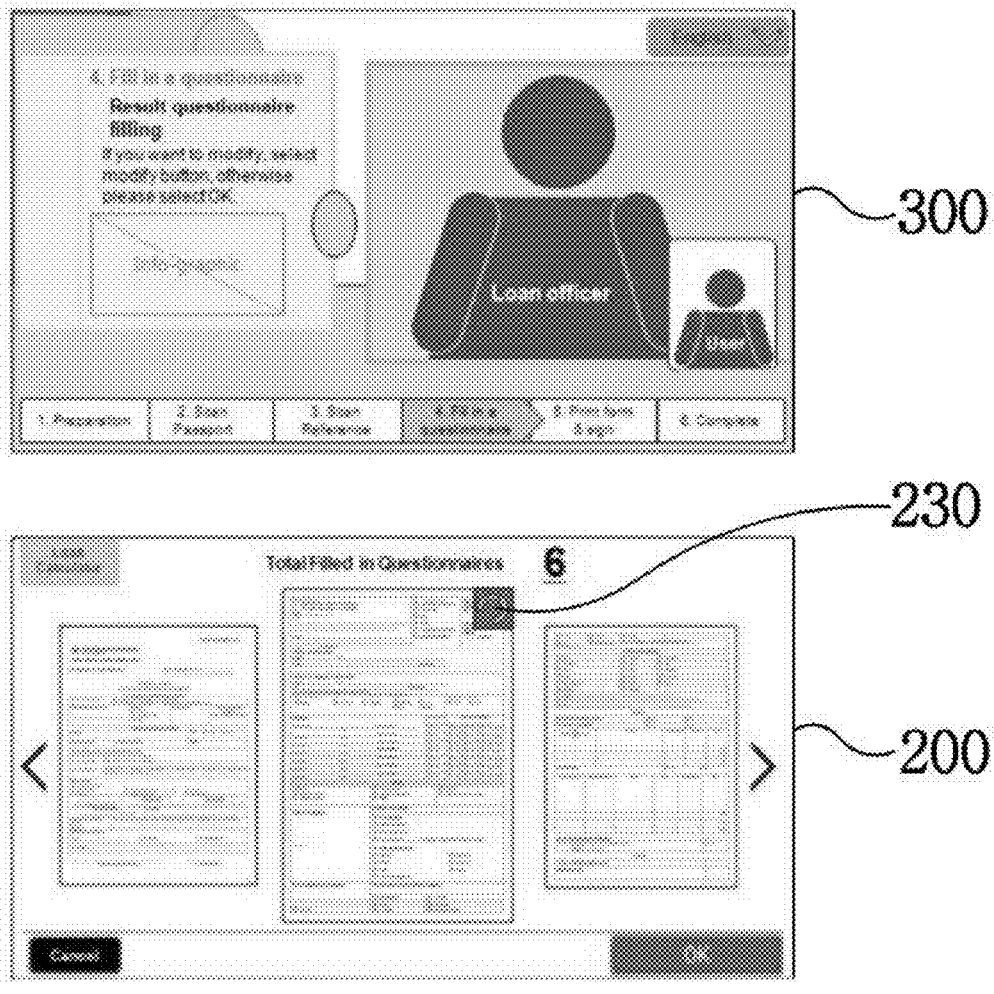
(d)

(a)

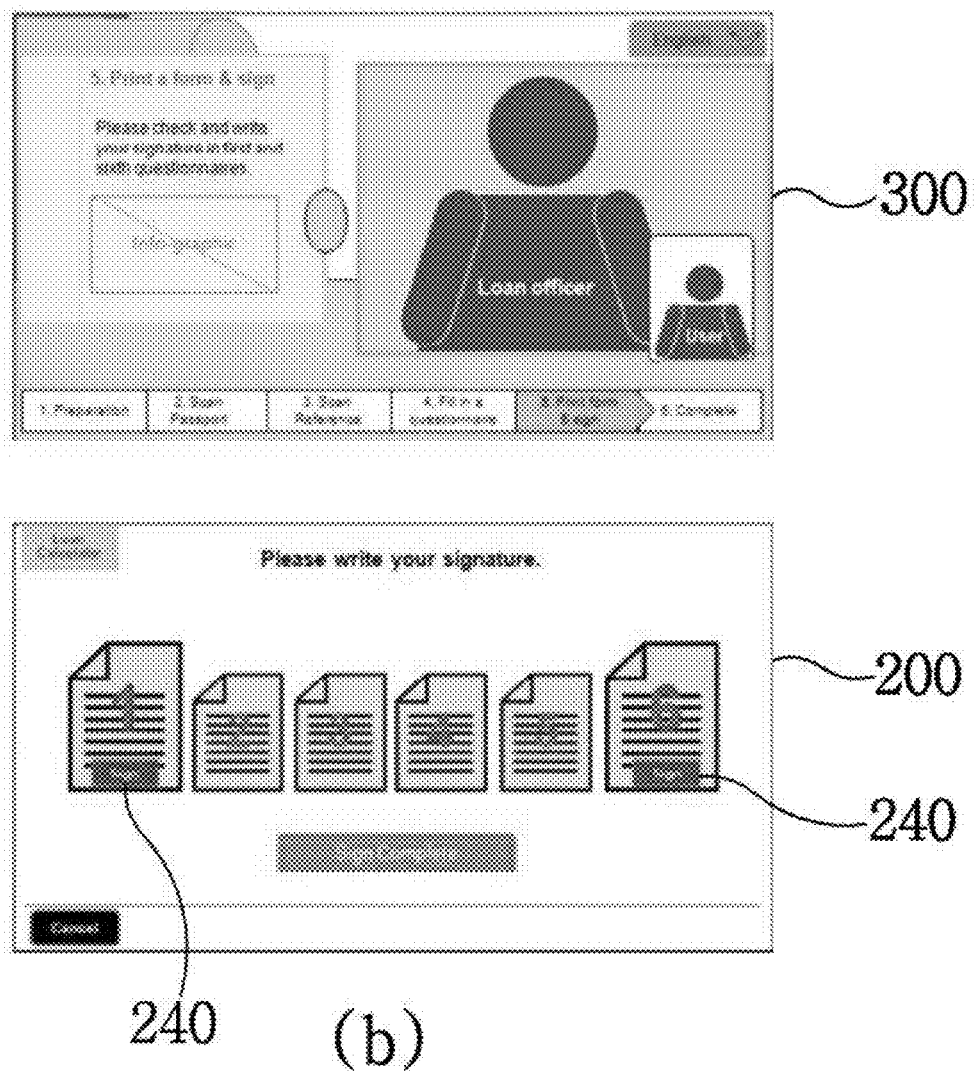
(b)

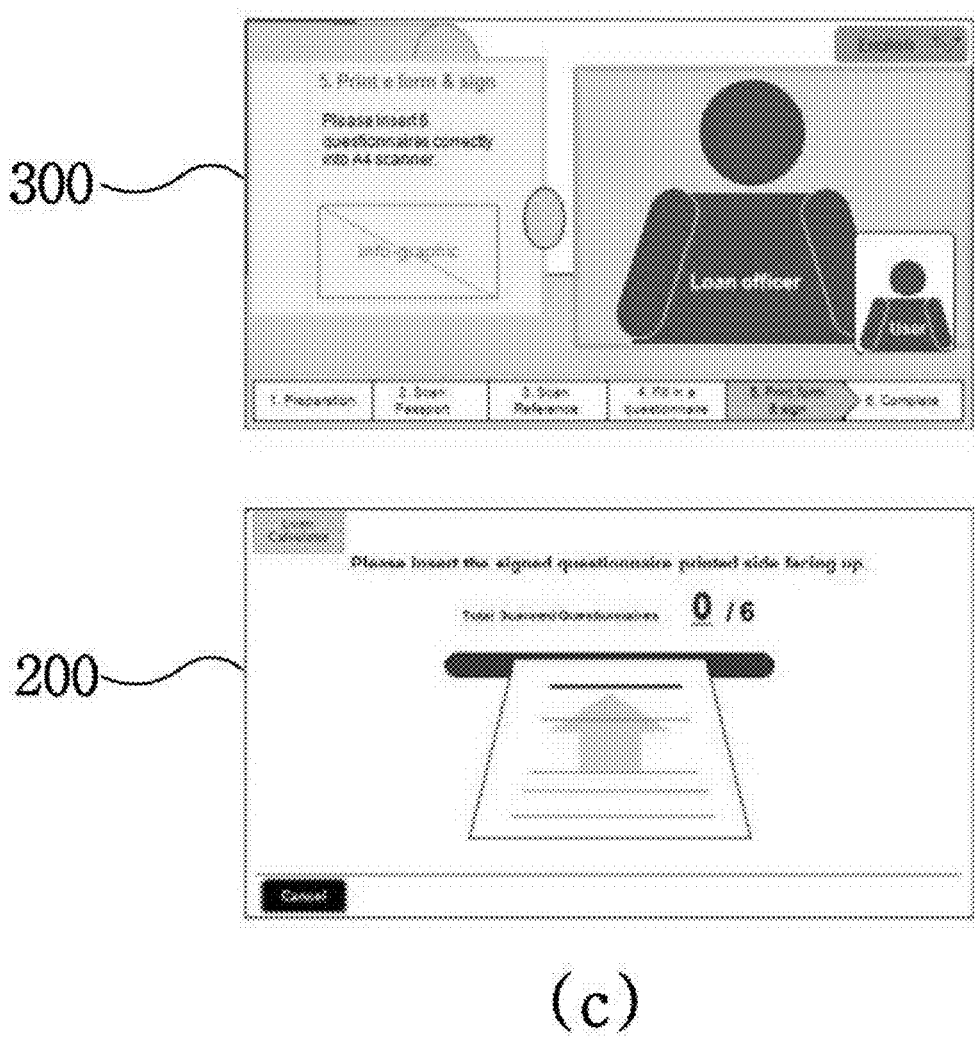
(c)

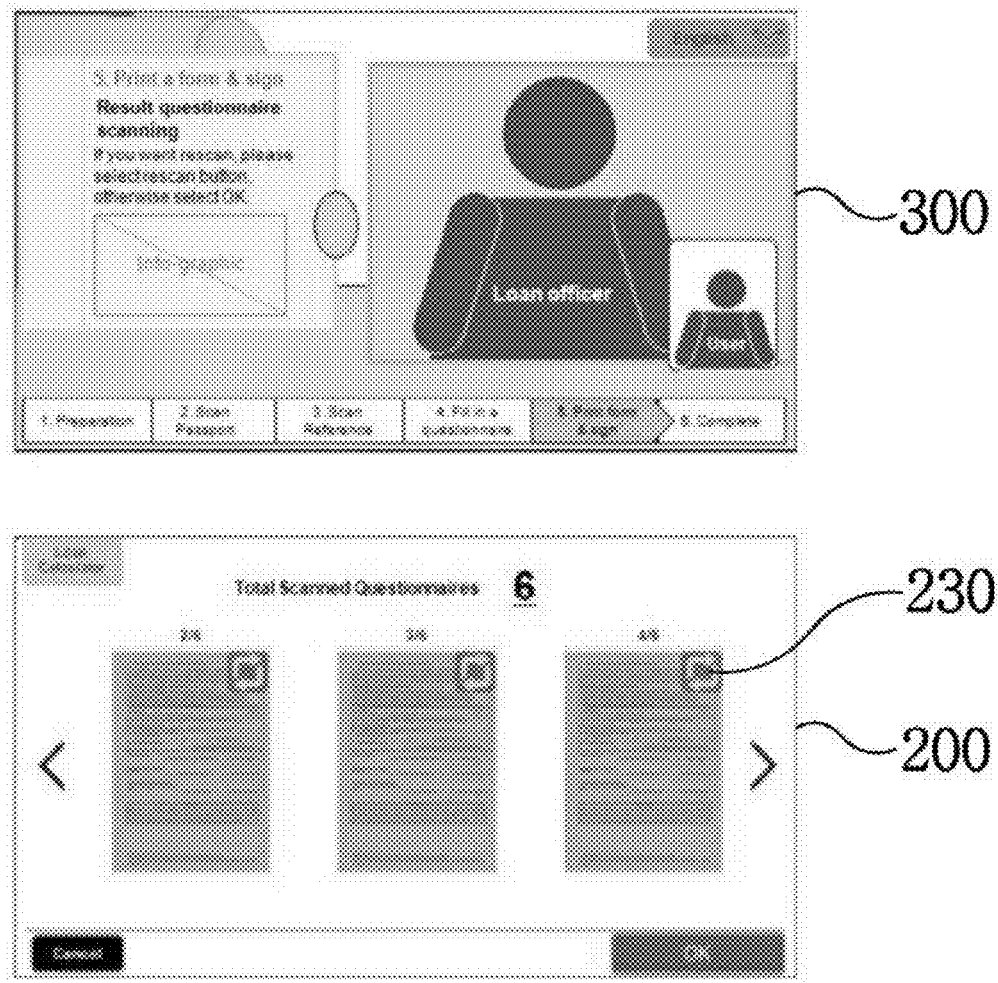
(d)

(a)

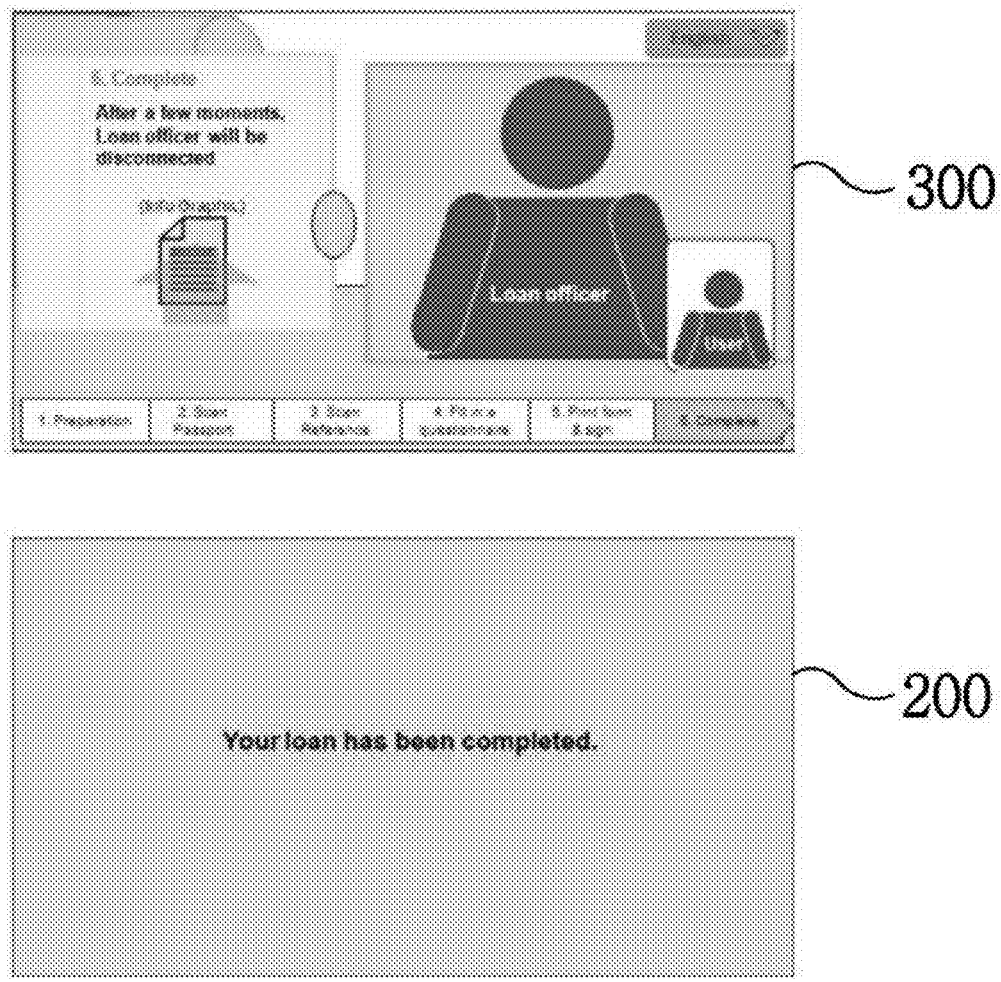
(b)

METHOD OF PROVIDING REMOTE FINANCIAL SERVICE USING REMOTE VIDEO BANKING MACHINE

CROSS-REFERENCE TO RELATED APPLICATION

This application claims priority to and the benefit of Korean Patent Application No. 10-2012-0122905, filed on Nov. 1, 2012, the disclosure of which is incorporated herein by reference in its entirety.

BACKGROUND OF THE INVENTION

1. Field of the Invention

The present invention relates to a method of providing a remote financial service using a remote video banking machine, and more particularly, to a method of providing a remote financial service using a remote video banking machine that has a document processing module and a video consultation supporting module integrally incorporated into a banking machine, so as to perform a financial transaction, wherein respective procedures for a financial transaction of a customer is guided through a screen of a display, and at the same time, if necessary, remote video face-to-face consultation with an officer is supported, and various certificate documents related to the financial transaction can be directly submitted from a remote position through the document processing module during the financial transaction, so that the customer can remotely and easily perform complicated financial transactions, such as deposit and withdrawal as well as a new account opening or a loan, through an informal branch provided with the remote video banking machine without separately visiting a bank branch.

2. Description of the Related Art

Generally, in order to open and operate a branch of a bank, a specific space should be secured, such that a safe facility in which cash may be kept should be provided in the space, and bank window terminals, various assistant apparatuses and a communication network for managing and operating the bank counter terminals and the various assistant apparatuses should be also constructed.

Further, clerical assistant apparatuses for performing various financial services such as counters for coins and banknotes, copy machines, and scanners should be provided, and various security facilities for safety and security should be also installed.

Accordingly, there are disadvantages in that a wide space should be secured and considerable costs for installing various apparatuses and operating various services should be required to open a bank branch as described above. In particular, there is a problem in that prior occupation of a space as well as a burden of expense required for opening a bank branch may be considerable in opening a bank branch in a specific building or around a main street due to competition with other banking facilities.

In order to solve these problems, an automated banking machine such as an automated teller machine (ATM) has been recently developed along with development in information technology (IT) industry. At present, such an automated banking machine has been popularized and installed in various facilities such as hospitals, schools, departments and large-scaled markets as well as banking facilities, thereby providing an unmanned financial service to customers regardless of time and space.

Accordingly, the customer may easily process various financial tasks by using the automated banking machine installed near the customer without directly visiting a bank that has been utilized by the customer.

However, there is a problem in that only general financial transaction services such as cash withdrawal and deposit, wire transfer and account inquiry may be provided using a medium such as a customer's card or passbook in such an unmanned automated banking machine, whereas other financial services such as loan, card issuance and account opening that require a consultation or face-to-face identification with a financial officer cannot be provided.

Accordingly, in a conventional bank branch, bank windows for a number of officers in addition to an automated banking machine area are separately provided to process the financial transactions such as loan, card issuance and account opening that require consultation with the officers. However, in this system, the automated banking machine area and the bank windows for the officers are independently provided, so that a customer requiring consultation with one of the officers cannot help waiting unilaterally until the bank window for the consultation officer is unoccupied, resulting in causing the waiting time of the customer to be inevitably extended and thus a relatively large number of bank windows for officers to be provided. As a result, there is a problem in that the entire installation space is enlarged. Further, there is a problem in that even in an informally-operated branch, in order to support the financial services requiring consultation with a financial officer, the officer should always reside in the informally-operated branches.

SUMMARY OF THE INVENTION

Accordingly, the present invention is conceived to solve the aforementioned problems in the related art. An object of the present invention is to provide a method of providing a remote financial service using a remote video banking machine that has a document processing module and a video consultation supporting module integrally incorporated into a banking machine, so as to perform a financial transaction, wherein respective procedures for a financial transaction of a customer is guided through a screen of a display, and at the same time, if necessary, remote video face-to-face consultation with an officer is supported, and various certificate documents related to the financial transaction can be directly submitted from a remote position through the document processing module during the financial transaction, so that the customer can remotely and easily perform complicated financial transactions, such as deposit and withdrawal as well as a new account opening or a loan, through an informal branch provided with the remote video banking machine without separately visiting a bank branch.

According to an aspect of the present invention for achieving the objects, there is provided a method of providing a remote financial service using a remote video banking machine having a document processing module and a video consultation supporting module integrally incorporated into a banking machine, comprising the steps of: providing a customer with a financial service menu selection screen on a basic display provided in the remote video banking machine; causing the customer to select a desired financial service menu through the financial service menu selection screen; if the financial service menu selected by the customer requires video consultation with a bank officer, making a video connection with the officer through the video consultation supporting module to provide a video consultation screen on a video display provided in the video consultation supporting module; providing a screen for requesting identification of the customer and a document to be submitted according to a financial transaction application, on the basic display or video display; scanning an identification card and the document submitted by the customer through a scanner provided in the document processing module; and transmitting images of the identification card and the document obtained through the scan by the scanner to the officer to process a financial transaction of the customer.

BRIEF DESCRIPTION OF THE DRAWINGS

The above and other objects, features and advantages of the present invention will become apparent from the following description of a preferred embodiment given in conjunction with the accompanying drawings, in which.

DESCRIPTION OF THE PREFERRED EMBODIMENT

Hereinafter, a preferred embodiment of the present invention will be described in detail with reference to the accompanying drawings.

Figure 1:
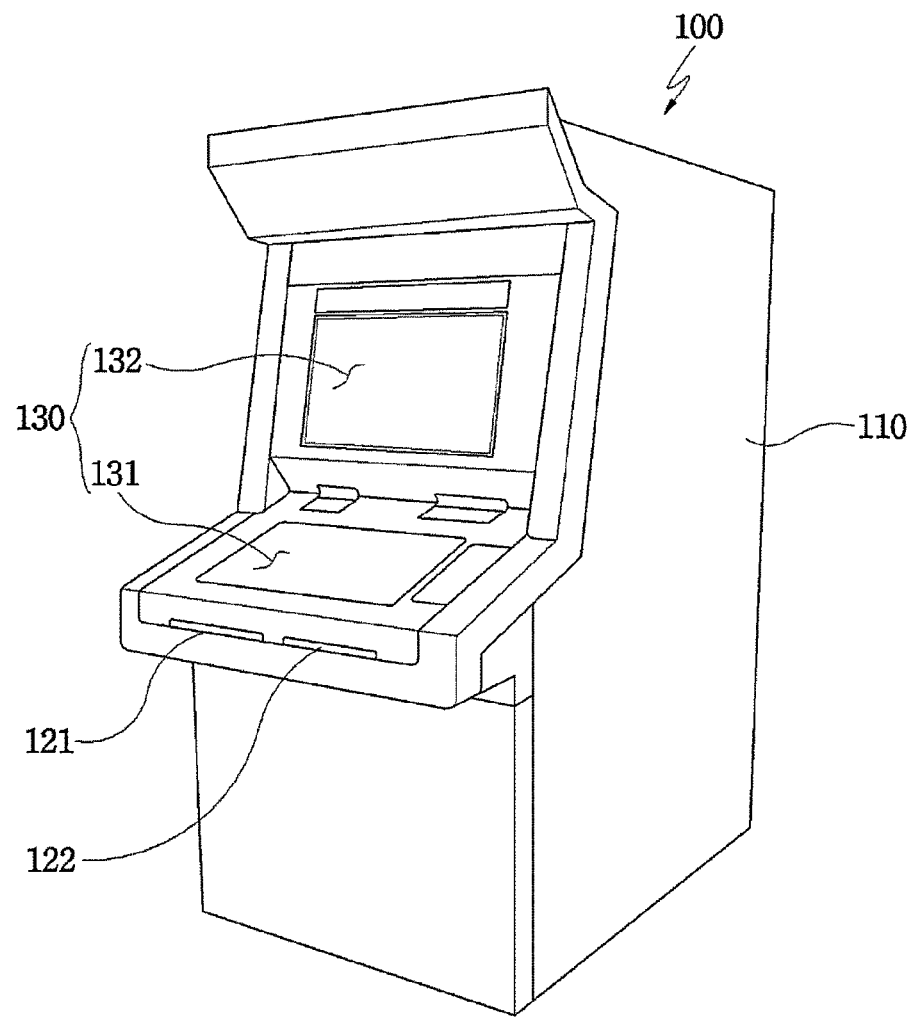
FIG. 1 is a view showing a remote video banking machine applied to an embodiment of the present invention.

FIG. 1 is a view showing a remote video banking machine applied to an embodiment of the present invention.

As shown in FIG. 1, a remote video banking machine 100 applied to an embodiment of the present invention is constructed by having a document processing module for scanning and printing various kinds of certificate documents including an identification card of a user as well as a video consultation supporting module for supporting remote video consultation with an officer, both of which are integrally incorporated into a conventional banking machine.

At this time, when a customer intends to perform a transaction for which consultation with an officer is required, the video consultation supporting module allows the transaction to be performed and includes a remote wire/wireless communication module (not shown) for supporting communications with the officer and a video display 132 for providing a video consultation screen required to get the video consultation with the officer.

Here, the video display 132 provides a video screen for providing the video consultation screen required to get the video consultation with the officer, wherein the screen of the video display 132 is interlocked with a screen of a basic display 131 provided in the banking machine.

That is, in the banking machine 100 according to the present invention, the screen of the basic display 131 for providing a user with a financial transaction menu button screen and an input button screen and the screen of the video display 132 for providing the video consultation screen required to get the video consultation with the officer are provided to be interlocked with each other, wherein various guide screens for allowing a customer to perform financial transactions may be provided through the screen of the basic display 131 and/or the screen of the video display 132.

Further, although the screen of the basic display 131 and the screen of the video display 132 are separately provided in the embodiment shown in FIG. 1, the display 130 provided in the banking machine according to the present invention needs not always be composed of two displays. Of course, a screen of one display may be divided into two sub-screens by a screen division scheme, so that the screens of the basic display and video display may be provided on the respective sub-screens.

The video consultation supporting module as described above provides the customer with the video consultation with the officer located in a remote position through the remote wire/wireless communication module and the video display 132, and at the same time, provides the customer with various financial information related to a financial transaction of the customer that is involved in the video consultation.

When the customer is required to submit related documents during the financial transaction, the document processing module supports the submission of the related documents and includes a scanner 121 for scanning user certificate documents (identification cards) such as a passport, a registration card, and a driving license of a user and documents required to be submitted for a financial transaction, and a printer 122 for printing related documents required to be filled up by the user, e.g., to be autographed by the user.

Such a document processing module serves to receive the related documents as image information through the scanner 121 and to transfer the image information through a communication means to a financial facility server, and further to output a file of the related documents, which has been transferred from the financial facility server, though the printer 122 to provide the customer with printed matter.

With such configuration as described above, the customer may perform a financial transaction self-directedly according to respective execution-procedure guide screens for the financial transaction provided through the conventional basic display. Further, if a video consultation with an officer is required for the financial transaction, the video consultation with the officer in charge of the financial transaction may be supported through the screen of the video display 132. Still further, if certificate documents are required to be submitted, the related certificate documents may be submitted directly from a remote place through the document processing module. As a result, the customer may easily and remotely perform complicated financial transactions such as loan and the like without separately visiting a bank branch.

At this time, a method of providing a financial service such as loan or the like using the remote video banking machine 100 as described above will be described in detail with reference to FIGS. 2 to 7.

FIGS. 2 to 7 are views exemplarily illustrating a method of providing a remote financial service using a remote video banking machine according to an embodiment of the present invention.

Figure 2:
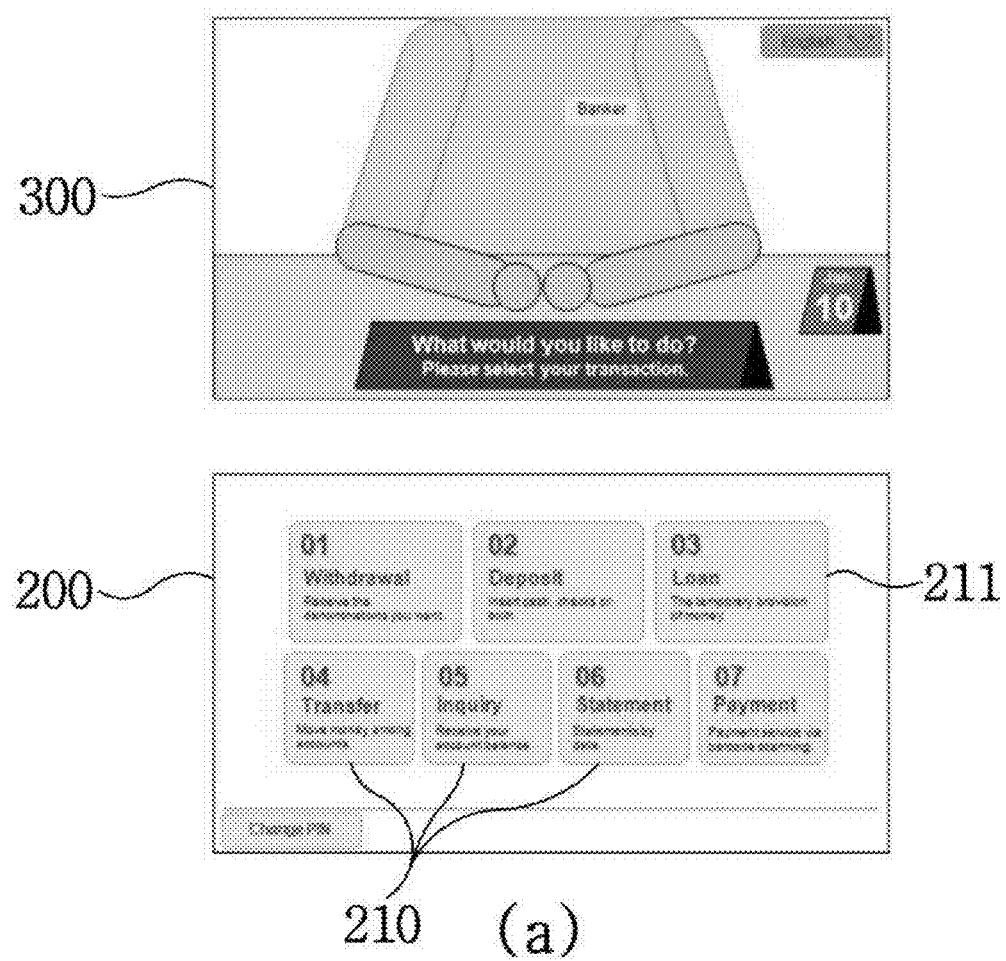
FIGS. 2 to 7 are views exemplarily illustrating a method of providing a remote financial service using a remote video banking machine according to an embodiment of the present invention.

As shown in FIG. 2 (a), when a customer wants to receive a financial service, a financial service menu selection screen for allowing the customer to input a financial transaction is provided through a basic display 200 of the video consultation supporting module, and a guide screen for requesting the customer to select the financial service is provided through a video display 300 of the video consultation supporting module.

At this time, menu buttons 210 for financial services such as cash deposit, cash withdrawal, wire transfer, account inquiry, loan, payment and consultation may be represented on the financial service menu selection screen. In addition, various financial service menus such as account opening, card issuance, financial consultation, an increase in transfer limit, and a change in customer information may be represented according to a configuration of support for the financial services.

Herein, when the customer applies for loan, the customer selects a loan menu button 211 on the financial service menu selection screen provided through the basic display 200.

At this time, a face-to-face identification by an officer for the identification of the customer is required to apply for a loan. Accordingly, as shown in FIG. 2 (*b*), a guide screen for requesting the customer to select progress of a loan process involving preparation for an identification certificate of the customer such as a passport and a loan application document is provided through the video display 300, and an input screen provided with a cancellation button and a confirmation button required to perform a transaction process is provided through basic display 200.

Then, when the customer has prepared the identification certificate such as the passport and the loan application document and selects the confirmation button in the input screen provided through the basic display, a video consultation screen 310 for supporting an image of a loan officer together with a guide screen for informing the customer of being connected with the loan officer is provided through the video display 300, and a guide screen for an execution procedure of a loan transaction is provided through the basic display 200, as shown in FIG. 2 (*c*).

At this time, a customer video 312 showing an appearance of the customer as well as an officer video 311 showing an appearance of the officer may be provided together on the video consultation screen 310 provided through the video display 300. Further, it is preferable that the video consultation screen 310 lasts on the video display 300 until the transaction of the customer is completed, so that the video consultation between the customer and the officer is not interrupted.

Then, when a remote video connection with the loan officer is established through the video consultation supporting module, the appearances of the officer and the customer are displayed respectively on the video consultation screen 310 in the video display 300, and at the same time, a guide screen for requesting the customer to scan the identification certificate (identification card) such as a passport is also provided on the video display 300, as shown in FIG. 2 (*d*).

Further, on the basic display 200, target pages to be scanned in an identification certificate for certifying the identity of the customer, e.g., in a passport as shown in FIG. 2 (*d*), are guided, and a menu button 220 for progressing the scan process is also provided.

Figure 3:
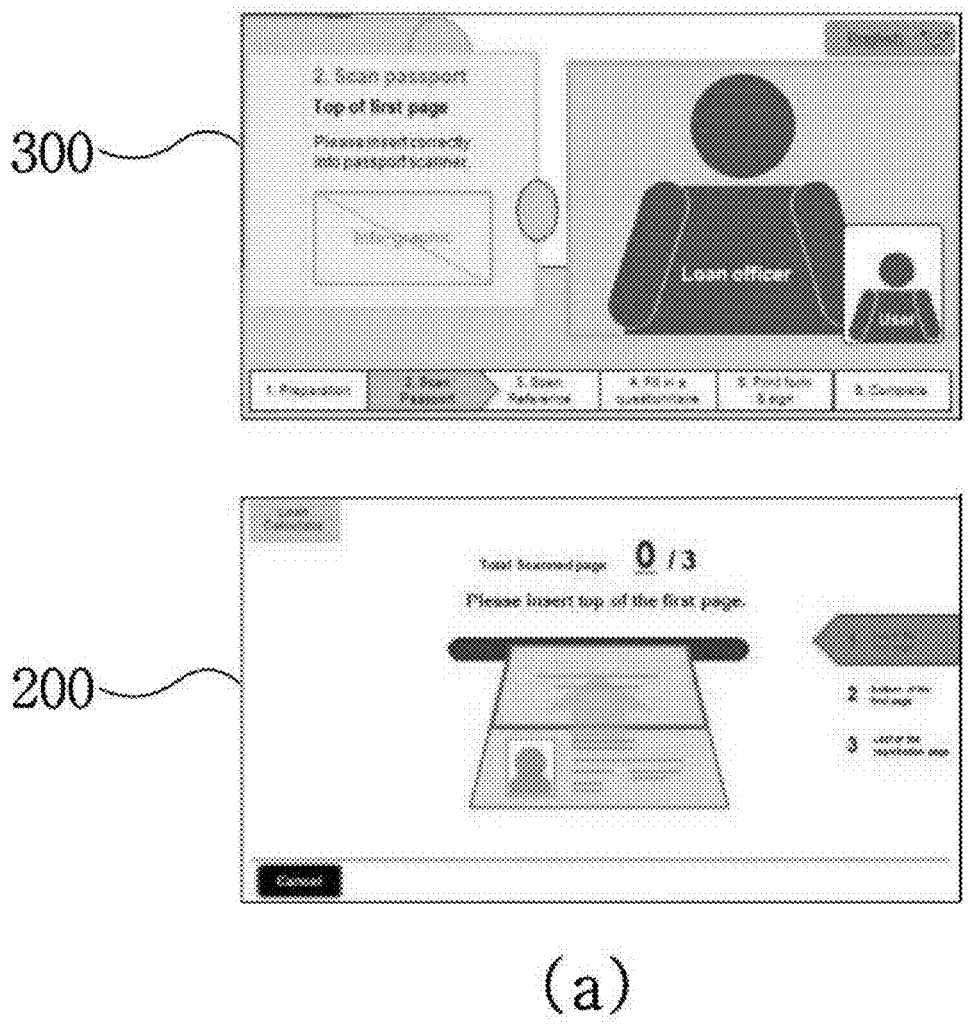

Accordingly, when the customer prepares the target pages of the passport to be scanned according to the guide screens provided on the video display 300 and the basic display 200 and then inputs the menu button 220 provided on the basic display 200, a guide screen for requesting the customer to scan the first of the target pages of the passport to be scanned is provided on the video display 300, and a guide screen for showing a method of inserting the corresponding page into an input slot of a scanner is provided on the basic display 200, as shown in FIG. 3 (*a*).

Then, when the customer inputs the corresponding page of the passport into the input slot of the scanner, a guide screen for informing the customer that the page input into the scanner is being scanned is provided on the video display 300, and a guide screen for showing the scan rate of the page being scanned is provided on the basic display 200, as shown in FIG. 3 (*b*).

When the corresponding page has been completely scanned through the scanner, a guide screen for informing the customer that the corresponding page has been completely scanned is provided on the video display 300, and a guide screen for requesting the customer to remove the corresponding page output from the scanner is provided on the basic display 200, as shown in FIG. 3 (*c*).

Then, when all the remaining pages to be scanned have been scanned through the scan process as described above with reference to FIGS. 3 (*a*) to 3 (*c*), a guide screen for requesting the customer to confirm the images of the certificate document input into and processed by the scanner is provided on the video display 300, and the respective images of the certificate document input into and processed by the scanner are provided on the basic display 200, as shown in FIG. 3 (*d*).

At this time, correction menu buttons 230 are provided for the respective images of the certificate document represented on the basic display 200 so that the corresponding certificate documents may be rescanned. By using the correction menu buttons 230, the customer may rescan the certificate documents that have been scanned imperfectly or are intended to be rescanned.

Here, when the customer inputs the correction menu button 230 for a specific certificate document, the corresponding certificate document can be scanned through the scan process as described above with reference to FIGS. 3 (*a*) to 3 (*c*).

Thereafter, when the customer confirms the respective certificate document images provided through the basic display 200 and inputs a confirmation (OK) button represented on the basic display 200, the scanned certificate document images are transmitted to the loan officer.

At this time, a guide screen for requesting the customer to wait for a moment is provided on the video display 300, and a guide screen for informing the customer that the certificate documents of the customer are being processed is provided on the basic display 200.

Figure 4:
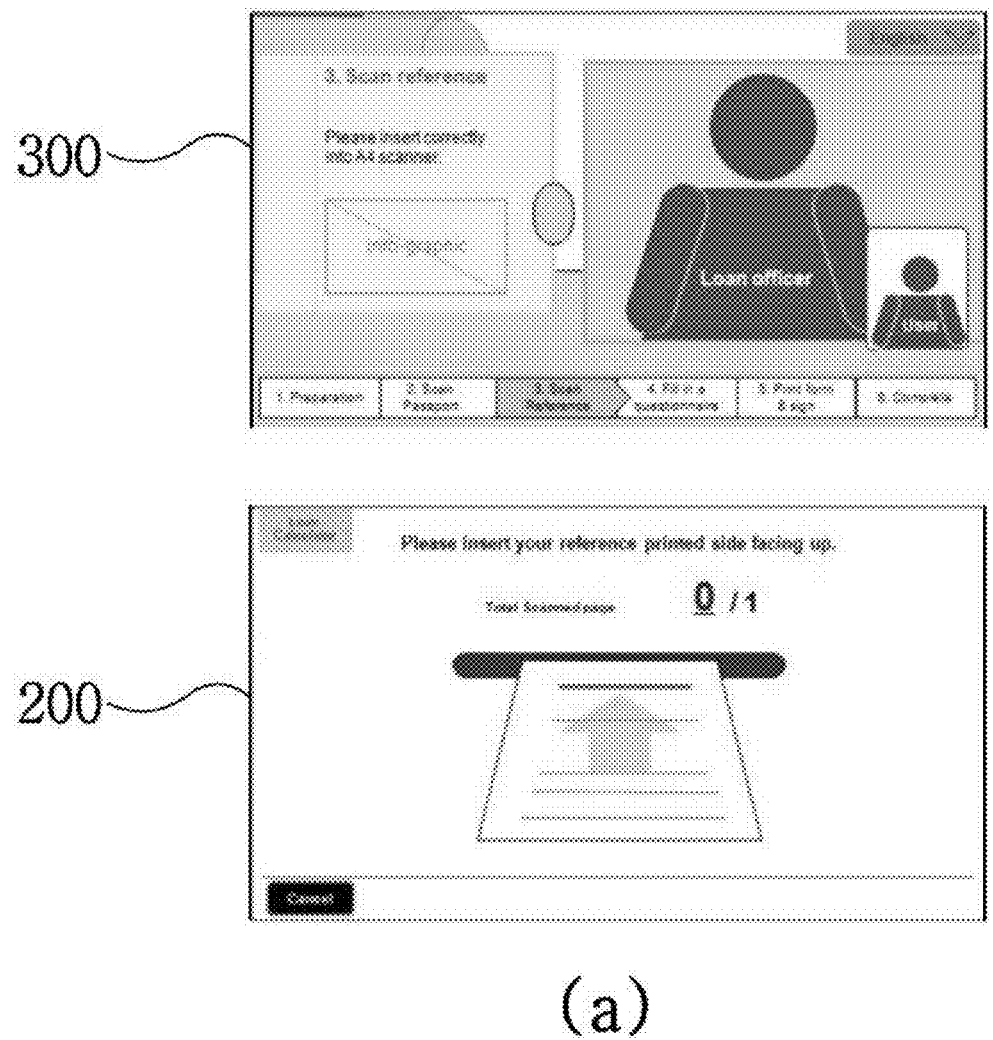

Then, when the identification of the customer has been completely confirmed by the responsible officer, a guide screen for requesting a scan of the loan application document prepared by the customer is provided on the video display 300, and a guide screen for showing a method of inserting the loan application document into the input slot of the scanner is provided on the basic display 200, as shown in FIG. 4 (*a*).

As such, when the customer inserts the loan application document into the input slot of the scanner, a guide screen for informing the customer that the application document inserted through the scanner is being scanned is provided on the video display 300, and a guide screen for showing the scan rate of the application document is provided on the basic display 200, as shown in FIG. 4(*b*).

When the application document has been completely scanned through the scanner, a guide screen for informing the customer that the application document has been completely scanned is provided on the video display 300, and a guide screen for requesting the customer to remove the application document output from the scanner is provided on the basic display 200, as shown in FIG. 4 (*c*).

Then, when the customer takes back the application document output from the scanner, a guide screen for requesting the customer to confirm the image of the application document input into and processed by the scanner is provided on the video display 300, and the image of the application document input into and processed by the scanner is provided on the basic display 200, as shown in FIG. 4 (*d*).

At this time, a correction menu button 230 is provided for the image of the application document represented on the basic display 200 in the same fashion as the images of the certificate document. The correction menu button 230 may allow the customer to selectively rescan and input the application document.

Meanwhile, when the customer confirms the image of the application document represented on the basic display 200 and then inputs a confirmation button provided on the basic display 200, the image of the scanned application document is transmitted to the loan officer.

At this time, a guide screen for requesting the customer to wait for a moment is provided on the video display 300, and a guide screen for informing the customer that the application document of the customer is being processed is provided on the basic display 200.

Figure 5:
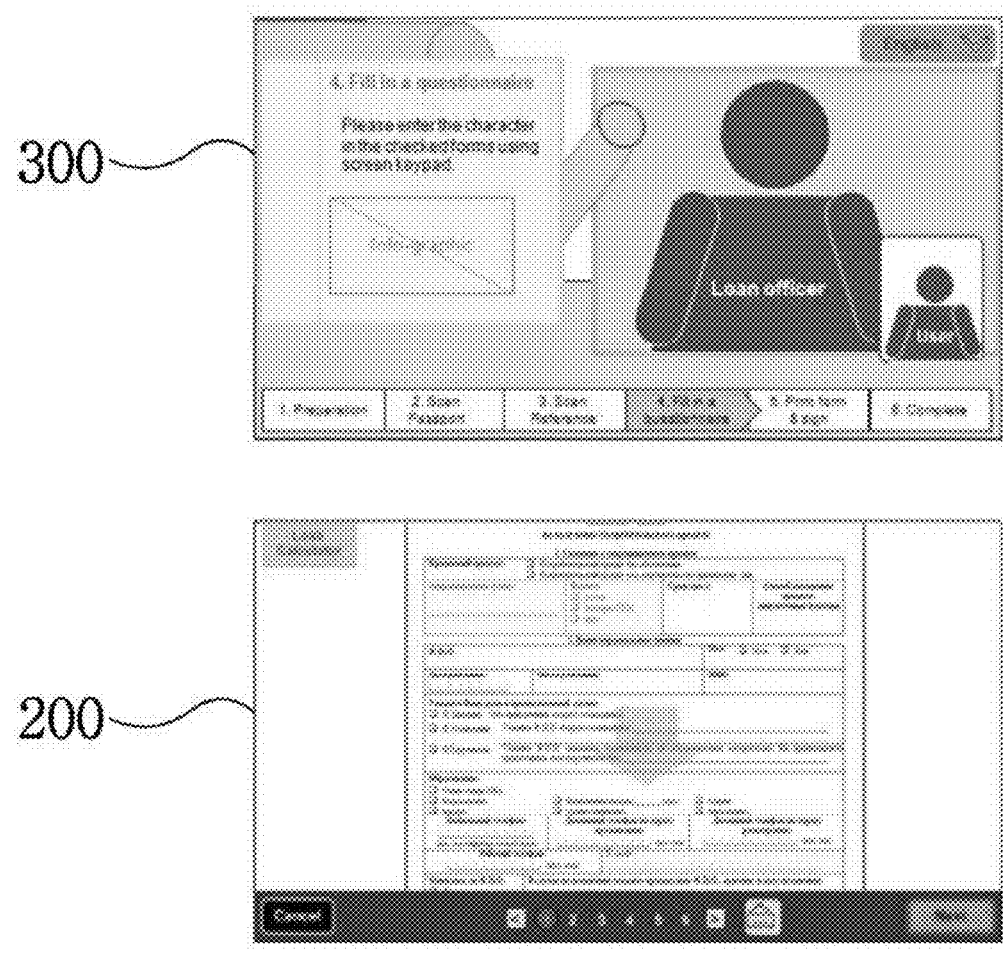

Then, a guide screen for requesting the customer to prepare detailed information filled-in documents required for the loan transaction is provided on the video display 300, and the detailed information filled-in documents are provided on the basic display 200, as shown in FIG. 5 (*a*).

At this time, blank columns for inputting detailed information required for the loan transaction such as a loan amount of the customer, a deposit account number, an e-mail address, and a contact detail are itemized in the detailed information filled-in documents. When the customer desires to input the corresponding information in the blank columns, a separate keypad is provided on the basic display 200 so that the customer may be allowed to easily input the respective corresponding information, or a keypad provided in the remote video banking machine may be used to input the information, as shown in FIG. 5 (*b*).

Thereafter, as shown in FIG. 5 (*c*), when the customer finishes filling the detailed information filled-in documents and inputs a confirmation button provided on the basic display 200, a guide screen for requesting the customer to confirm the detailed information filled-in documents is provided on the video display 300, and the respective detailed information filled-in documents are provided on the basic display 200, as shown in FIG. 5 (*d*).

At this time, the correction menu buttons 230 are also provided for the images of the detailed information filled-in documents represented on the basic display 200. Of course, the correction menu buttons 230 allow the customer to selectively correct the information that has been filled in the detailed information filled-in documents.

Meanwhile, when the customer confirms the images of the respective detailed information filled-in documents represented on the basic display 200 and then inputs a confirmation button provided on the basic display 200, the confirmed images of the detailed information filled-in documents are transmitted to the loan officer.

At this time, a guide screen for requesting the customer to wait for a moment is provided on the video display 300, and a guide screen for informing the customer that the detailed information filled-in documents of the customer are being processed is provided on the basic display 200.

Figure 6:
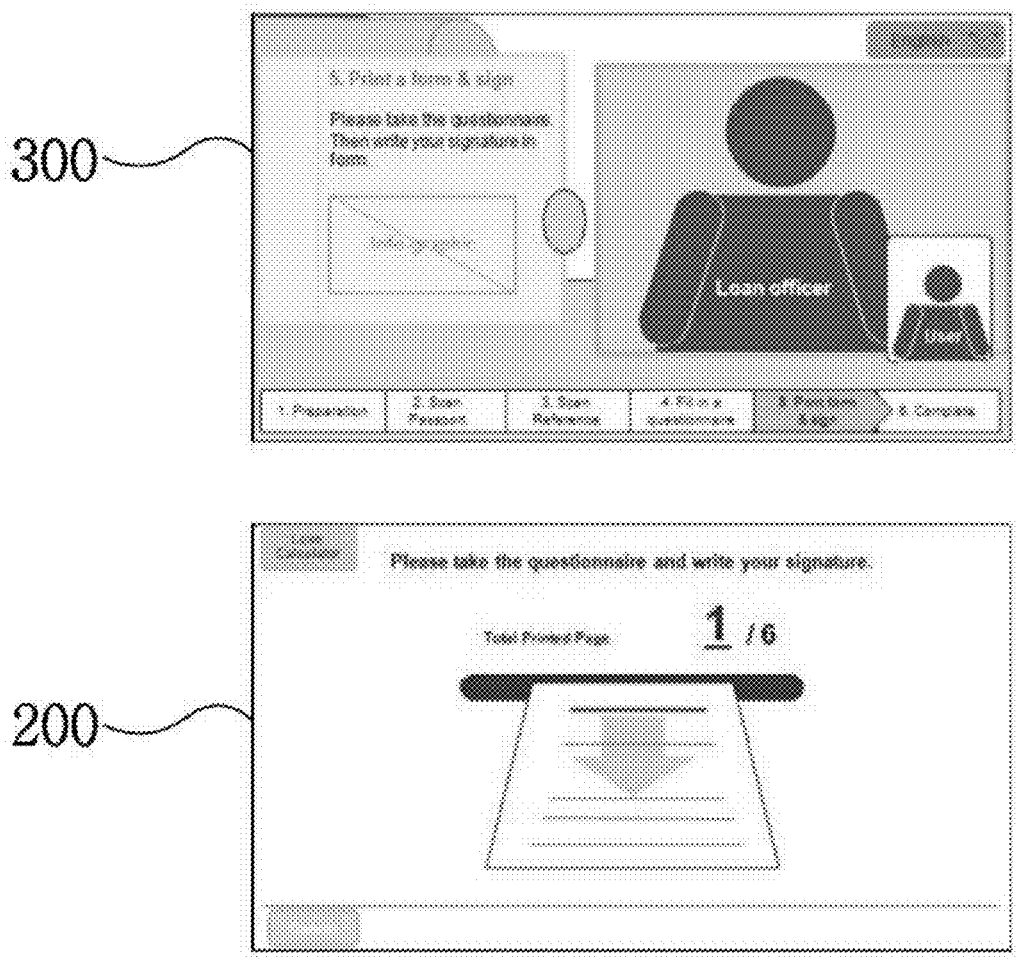

Thereafter, when the detailed information filled-in documents for the loan transaction are confirmed by the loan officer, a guide screen for requesting the customer to sign the autograph of the customer on the confirmed detailed information filled-in documents is provided on the video display 300, and a guide screen for requesting the customer to remove the detailed information filled-in documents provided from an outlet of a printer is provided on the basic display 200, as shown in FIG. 6 (*a*).

At this time, the printer outputs the respective detailed information filled-in documents that have been filled with the detailed information directly input by the customer, so that the customer may sign the autograph of the customer on the output detailed information filled-in documents.

Meanwhile, when the customer removes the detailed information filled-in documents output from the printer, a guide screen for requesting the customer to sign the autograph on target pages of the detailed information filled-in documents is provided on the video display 300, and a guide screen for showing positions 240 at which the customer autographs in the target pages is provided on the basic display 200, as shown in FIG. 6 (*b*).

At this time, when the customer finishes signing the autograph on the detailed information filled-in documents and inputs a confirmation button provided on the basic display, a guide screen for requesting the customer to scan the detailed information filled-in documents autographed by the customer is provided on the video display 300, and a guide screen for showing a method of inserting the detailed information filled-in documents into the input slot of the scanner is provided on the basic display 200, as shown in FIG. 6 (*c*).

Thereafter, when the customer inputs all the respective detailed information filled-in documents through scans according to the scan guide screen provided on the basic display 200, a guide screen for requesting the customer to confirm the respective detailed information filled-in documents is provided on the video display 300, and the images of the respective detailed information filled-in documents input into and scanned by the scanner are represented on the basic display 200, as shown in FIG. 6 (*d*).

At this time, the correction menu buttons 230 as described above are provided for the images of the respective detailed information filled-in document so that the customer may selectively rescan the detailed information filled-in documents.

Meanwhile, when the customer confirms the images of the respective detailed information filled-in documents and inputs a confirmation button provided on the basic display 200, the images of the respective detailed information filled-in documents are transmitted to the loan officer. At this time, as shown in FIG. 7 (*a*), guide screens for a message of thanks for using the financial service are provided on the video display 300 and the basic display 200.

Figure 7:
Figure 7:
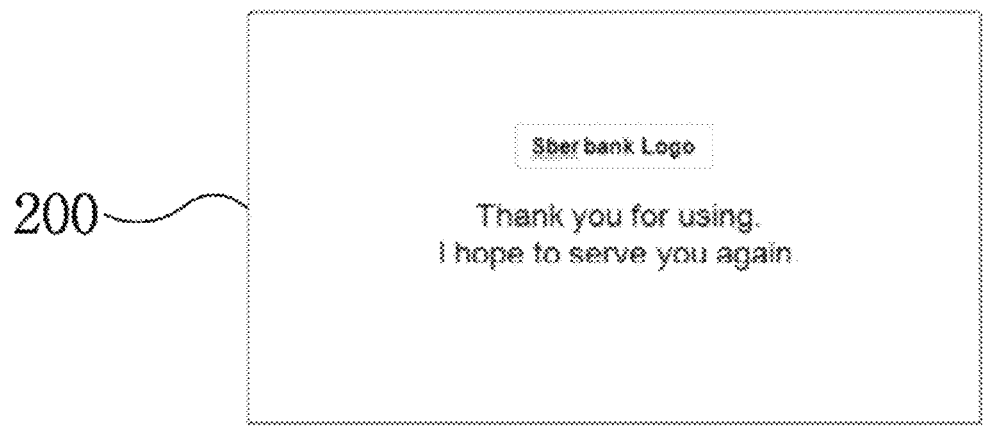

Then, when all the detailed information filled-in documents required for the loan transaction have been confirmed by the loan officer, a guide screen for informing the customer that the video consultation with the officer will be disconnected is provided on the video display 300, and a guide screen for informing the completion of the loan transaction of the customer is provided on the basic display 200, as shown in FIG. 7 (*b*).

Meanwhile, since the video connection with the officer is maintained throughout the process as described above, it is natural that the customer may directly inquire of the officer about the transaction or receive other financial consultation if any inquiry or consultation is required during the financial transaction.

As described above, the method of providing the remote financial service according to the present invention sequentially provides the displays with various input screens for the financial transaction by using the remote video banking machine, so that the customer may directly input the related information to apply for the corresponding financial service. Further, if the face-to-face consultation with the officer and the submission of a document are required, e.g., in the loan process, the method may be configured to support a video for the remote consultation with the officer and to directly submit various certificate documents at a remote position, so that complicated financial transactions such as loan may be also remotely and easily performed through an informal branch provided with the remote video banking machine.

Figure 8:
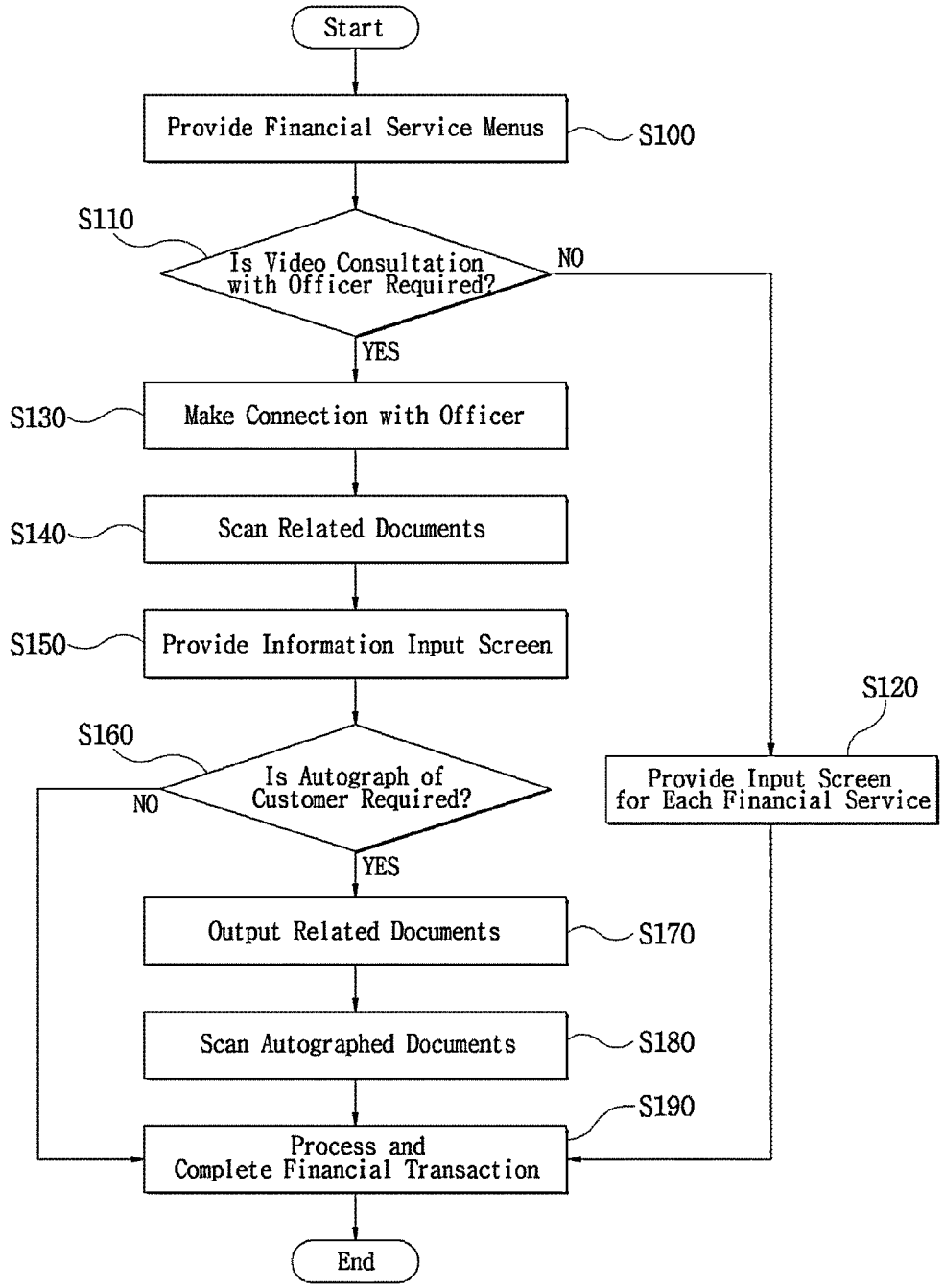
FIG. 8 is a flow chart showing a schematic process of the method of providing a remote financial service using a remote video banking machine according to the embodiment of the present invention.

FIG. 8 is a flow chart showing a schematic process of a method of providing a remote financial service using a remote video banking machine according to an embodiment of the present invention.

As shown in FIG. 8, the method provides a financial service menu selection screen, which is provided with menu buttons for financial transactions such as cash withdrawal and deposit, wire transfer, account inquiry and loan, on the basic display (S100).

At this time, it is natural that the financial service menus provided on the financial service menu selection screen may include various financial service menus such as an increase of transfer limit based on a financial transaction configuration and a change in customer information, in addition to cash withdrawal and deposit, wire transfer, account inquiry, and loan as described above.

Thereafter, if financial service menu selection information is input from the customer through the financial service menu selection screen, it is checked whether video consultation with an officer is required to process a selected financial transaction of the customer (S110).

At this time, when the customer selects one of the financial service menus such as cash withdrawal and deposit, wire transfer and account inquiry that may be processed by the customer for oneself without the handling of the officer, an input screen for each financial service is provided on the basic display (S120), so that the financial transaction may be processed and completed based on the information input by the customer (S180).

Meanwhile, when the customer selects financial service menus such as loan that inevitably requires face-to-face consultation with the officer, video consultation with the officer is established through a video consultation supporting module (S130) to provide a video consultation screen on a video display.

Thereafter, when a certificate document (identification card) for identifying the customer such as a passport, a registration card and a driving license, and/or a related document such as a financial transaction application document are required to be submitted during the financial transaction of the customer, the related documents are scanned by a scanner (S140) and images of the scanned documents are remotely transmitted to the officer, so that the officer may be allowed to process them.

Further, when detailed information on the financial transaction of the customer is required to be input, an information input screen is provided on the basic display (S150) so that the customer may be allowed to input related detailed information through a keypad provided on the basic display or a keypad provided in the remote video banking machine.

At this time, when the autograph of the customer is required on the related documents for the financial transaction that have been processed by the officer (S160), the documents on which the autograph of the customer are required are output through a printer (S170) so that the printed documents may be provided to the customer, and the documents that have been autographed by the customer are scanned and input through the scanner (S180).

Then, the related documents scanned and input through the scanner are transmitted to and processed by the officer, so that the financial transaction of the customer can be completed (S190).

As described above, in the method of providing a remote financial service using a remote video banking machine according to the present invention, a remote video banking machine that has a document processing module and a video consultation supporting module integrally incorporated into a banking machine is used to perform a financial transaction, whereby there are advantages in that respective procedures for a financial transaction of a customer is guided through a screen of a display, and at the same time, if necessary, remote video face-to-face consultation with an officer is supported, and various certificate documents related to the financial transaction can be directly submitted from a remote position through the document processing module during the financial transaction, so that the customer can remotely and easily perform complicated financial transactions, such as deposit and withdrawal as well as a new account opening or a loan, through an informal branch provided with the remote video banking machine without separately visiting a bank branch.

Further, there are additional advantages in that unnecessary waiting time of the customer may be reduced by considerably automating customer's fact-to-face consultation with a bank officer, thereby more rapidly processing the financial transaction of the customer; and the work efficiency of the officer may be enhanced through the customer's active work process.

It will be apparent to those skilled in the art that the present invention is not limited by the embodiment described above and the accompanying drawing and various modifications and changes can be made thereto without departing from the scope and spirit of the invention.

What is claimed is:

1. A method of providing a remote financial service using a remote video banking machine having a document processing module and a video consultation supporting module, comprising the steps of:

displaying a financial service menu selection screen on a first display device provided in the remote video banking machine to cause a user to select one of a plurality of financial services;

responsive to the user selecting a first financial service that does not require video consultation, displaying information on the first display device and a second display device in an interlocked manner, the second display device provided in the video consultation supporting module;

responsive to the user selecting a second financial service that requires video consultation with a bank officer, making a video connection with the officer through the video consultation supporting module to provide a video consultation screen on the second display device;

responsive to requiring detailed information on the first or second financial service, displaying an information input screen on the first display to receive the detailed information from the user;

displaying a screen for requesting identification of the user and a user's document for submission in the second financial service on the first or second display device;

scanning an identification card and the user's document through a scanner provided in the document processing module;

transmitting images of the identification card and the document obtained by scanning to the officer; and responsive to requiring a signature from the user,
printing a document through a printer provided in the document processing module to have the user sign the printed document;
displaying a guide screen on the first display device showing a location on the document to be signed by the user; and
scanning the printed document signed by the user.

2. The method of claim 1, further comprising the step of:
if detailed information on the financial transaction of the customer is required, displaying an information input screen on the first display to receive related detailed information from the customer.

3. The method of claim 1, wherein the financial service menu selection screen includes menus for cash withdrawal and deposit, wire transfer, account inquiry, payment, account opening, card issuance, loan, and consultation.

4. The method of claim 1, wherein before the step of transmitting the images of the identification card and the document obtained through the scanner, displaying the image of the document obtained through the scanner to a customer to allow the customer to correct or confirm the image.

5. The method of claim 1, wherein the identification card is any one of a passport, a registration card, and a driving license.

6. The method of claim 1, wherein the video consultation screen provided on the video display is provided with both an officer video showing an appearance of the officer and a customer video showing an appearance of a customer.

* * * * *